July 6, 1926.                                                1,591,853
W. J. MacARTHUR
PROCESS OF REMOVING WATER FROM PETROLEUM OIL
Filed May 17, 1923

INVENTOR:
WILLIAM J. MAC ARTHUR,
BY
Graham + Rains
ATTORNEYS.

Patented July 6, 1926.

1,591,853

UNITED STATES PATENT OFFICE.

WILLIAM J. MacARTHUR, OF LOS ANGELES, CALIFORNIA, ASSIGNOR OF ONE-HALF TO REA E. MAYNARD.

PROCESS OF REMOVING WATER FROM PETROLEUM OIL.

Application filed May 17, 1923. Serial No. 639,722.

My invention relates to the art of separating water from oil. In the production of petroleum oil wells are often encountered which produce in addition to large volumes of oil, considerable volumes of water. If these wells flow under considerable pressure, as is usually the case with large productive wells, it is a common practice to restrict the flow after the oil leaves the well for the purpose of preventing the well from sanding up, due to excessive movement of gas and oil. The well is commonly restrained by passing the fluid through a constricted orifice in which a trap under pressure of several hundred pounds per square inch may occur. If a mixture of oil and water is passed at a high velocity through such a constricted orifice, the water and oil are so broken up and mingled that they form an emulsion, the water commonly appearing as free, fine particles suspended in the body of oil. These emulsions are extremely difficult to separate. It is a well known fact that the water and oil in these high pressure wells is not in the form of an emulsion, and if the water and oil are separated before the pressure is released thereon, emulsions will not be formed.

It is an object of my invention to provide a novel process of separating the oil and water for the purpose of preventing the formation of emulsions. My invention involves a novel method of separating water and oil and while it is described as applying to a particular purpose, namely, the separation of petroleum oils and water as they come from an oil well, it is to be understood that my invention is not restricted to this particular application since it can be applied to any use in which it is desired to separate oil and water.

Further objects and advantages will be made evident hereinafter.

Referring to the drawings which are for illustrative purposes only,

Figure 1:
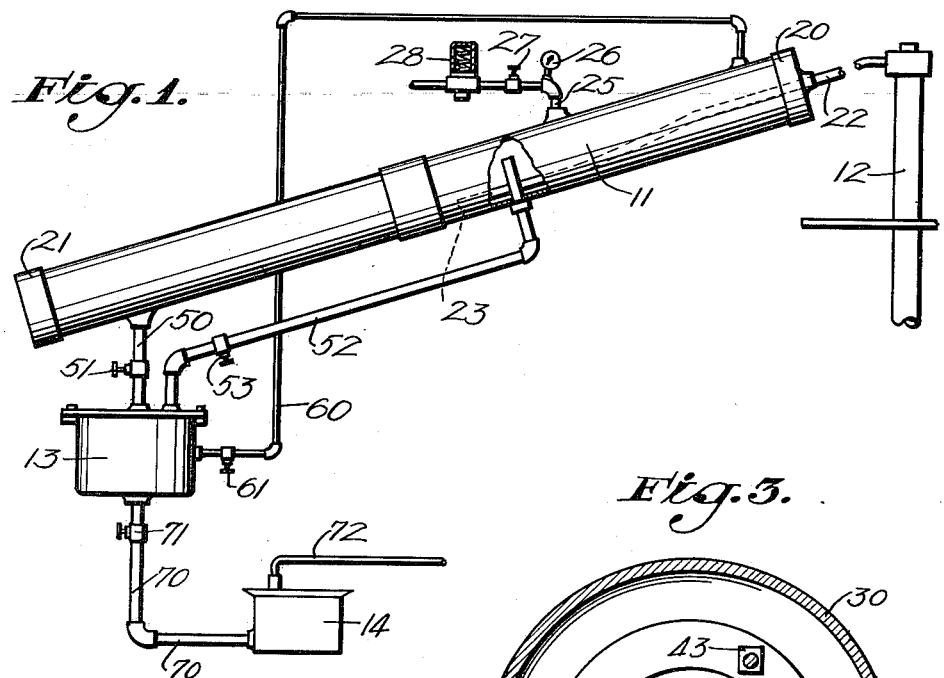
Fig. 1 is a side elevation partly in section of a complete apparatus attached to separate oil from water as it comes from an oil well.
Figure 3:
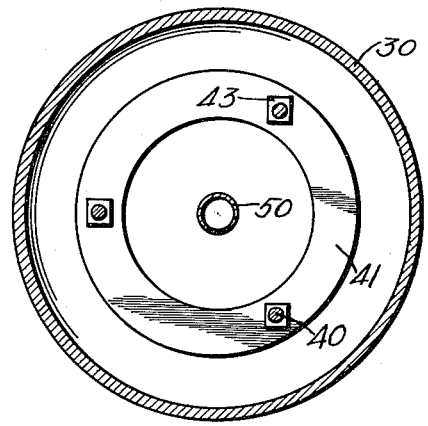
Fig. 3 is a section on a plane indicated by the line 3—3 of Fig. 2.
Figure 2:
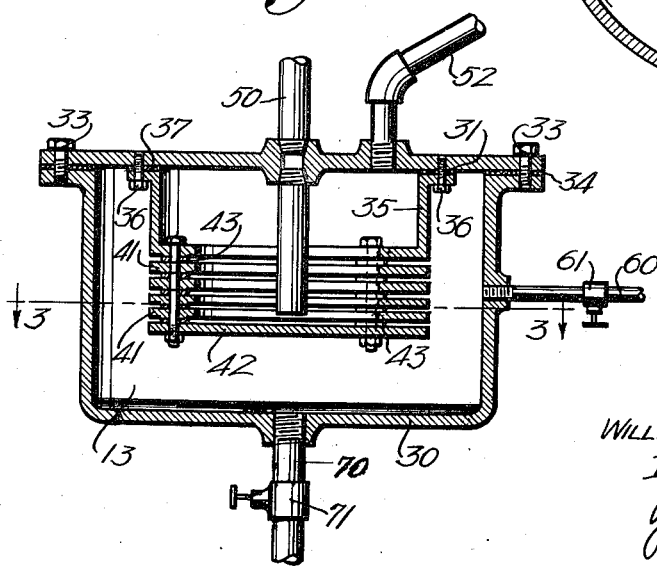
Fig. 2 is a section through the separator.

In the embodiment of my invention shown I employ a settling chamber 11, from which fluid to the casing head 12 is delivered, in conjunction with a novel form of water separator 13 and a fluid trap 14. The settling chamber 11 may conveniently be constructed of several joints of large pipe connected together and placed on an incline so that the end 20 is higher than the end 21. The oil delivery pipe 22 enters through the end 20 and passes to a point 23 inside the settling chamber. The oil and gas take-off pipe 25 is connected into the top of the settling chamber 11, preferably above the point 23. The pipe 25 is provided with a gauge 26, a hand operated valve 27 and an automatic pressure regulating valve 28. The water separator 13 consists of an outer shell or casing 30, having a cover 31 secured thereto by bolts 33, a gasket 34 being provided between the casing 30 and the cover 31. Secured to the cover 31 inside the casing 30 is a casting 35, which is secured to the cover 31 by the bolts 36, a gasket 37 being provided between the cover 31 and the casting 35. Secured to the casting 35 by means of bolts 40 are a plurality of annular rings 41 and a cover 42. Thin metal washers 43 are placed around the bolts 40 between the plates 41, acting as shims to separate the plates 41 by a uniform but small distance. Oil and water are delivered to the space inside the casting 35 from the bottom of the settling chamber 11 by means of a pipe 50 having a valve 51. Oil is delivered from the top of the space inside the casting 35 through a pipe 52, having a valve 53 to the settling chamber, at a point preferably above the point 23. A gas equalizing pipe 60 having a valve 61 extends from the casing 30 up into the extreme top of the settling chamber 11. A water outlet pipe 70 having a valve 71 extends from the bottom of the casing 30 to the trap 14. The trap 14 is a standard steam trap, that is it is a device which is so arranged that any liquid passing into the trap 14 from the pipe 70 is delivered to a pipe 72.

The method of operation is as follows:

The mixture of oil, water and gas from the casing head 12 passes through the pipe 22 into the settling chamber 11, in which the water tends to settle to the bottom, and the gas and oil tend to rise to the top. A pressure is maintained on the settling chamber due to the regulating valve 28 which regulates the flow of gas and oil from the top of the trap so that a uniform and constant pressure is maintained on the settling chamber 11 and on the casing head 12 of the well, this uniform pressure being desirable to prevent injury to the wall through too violent movement of oil and gas therein. The oil and gas delivered through the pipe 25 may be passed through a standard oil and gas separator, not shown, to separate the gas from the oil if desired, and this may be accomplished either before or after the pressure is relieved. The water which settles in the bottom of the chamber 11, near the end 21, passes downwardly through the pipe 50 into the space inside the casting 35. The casting 35 and the rings 41 with the cover 42 form a closed container having small openings in the walls thereof, that is, through the small openings between the rings 41. The walls of these openings having first been wet with water in starting the device are so narrow that the film of water formed therein resists the intrusion of oil, the action probably depending upon the surface tension of the water or oil, so that water will flow readily through these small openings but oil is excluded therefrom. To prevent an excessive pressure being placed upon these water films, I provide a gas equalizing pipe 60 which supplies a pressure at all times to the space inside the casting 30, and equalizes the gas pressure on either end of the film of water. In practice the water flows very freely through the openings between the plates 41, and is delivered through the pipe 70 to the trap 14, by which it is automatically discharged as it collects to the pipe 72. Any oil entering the space inside the casting 35 rises in this space and tends to flow back, due to its greater buoyancy, through the pipe 52 and into the upper portion of the settling chamber 11. If at any subsequent time no more water is delivered from the pipe 50, all flow through the space between the plates 41 ceases, but the water film between the plates will prevail so that at no time is any oil delivered to the pipe 70. My invention involves a new process or method of removing water from oil by the use of what may be termed capillary films, that is, films between water-wetted surfaces which are so thin that they resist any intrusion of oil, acting as automatic means for draining water from a container and preventing the escape of oil therefrom. In actual practice I have found that the most effective degree of separation of the several plates or rings is in fact dependent somewhat upon the material of which they are made, their width (which determines the length of the respective capillary passages) and the character of the oil. Certain tests proved that with rings constructed of brass and having a width of two and one-half inches, efficient separation of water from oil of 34° gravity test was effected with the rings relatively spaced a distance of approximately one-hundredth of an inch apart. While I have shown my invention applied to an oil well for the purpose of separating oil from petroleum mixtures of oil and water, I wish it to be definitely understood that this is one application only of my process, and that I reserve to myself the right to make other applications of the process or method, the breadth of my invention being defined solely by the enclosed claims.

I claim as my invention:

1. A method of separating oil from a mixture of oil and water which comprises: establishing two independent surfaces sufficiently near to each other to form a capillary opening therebetween; establishing a capillary water film in said opening and thereafter submitting the oil and water mixture to the separating action of said capillary opening.

2. The method of separating oil from a mixture of oil and water which comprises: establishing two independent surfaces sufficiently near to each other to form a capillary opening of uniform width; establishing a capillary water film in said opening and thereafter submitting the oil and water mixture to the separating action of said capillary opening.

3. The method of separating oil from a mixture of oil and water which comprises: making a surface ordinarily pervious to oil and water impervious to oil while remaining pervious to water by establishing a film of water over such surface and exposing the mixture to the separating action of treated surface.

4. The method of making a filter having capillary openings ordinarily pervious to oil or water impervious to oil while remaining pervious to water, which comprises: subjecting the capillary openings to a film of water.

5. The method of making a filter having capillary openings ordinarily pervious to oil and water impervious to oil while remaining pervious to water which comprises: establishing a film of water over the capillary openings.

In testimony whereof, I have hereunto set my hand at Los Angeles, California, this 9th day of May, 1923.

WILLIAM J. MacARTHUR.